US008547557B2

(12) United States Patent
Jansen

(10) Patent No.: US 8,547,557 B2
(45) Date of Patent: Oct. 1, 2013

(54) APPARATUS FOR DETERMINING A HEIGHT MAP OF A SURFACE THROUGH BOTH INTERFEROMETRIC AND NON-INTERFEROMETRIC MEASUREMENTS

(75) Inventor: Maarten Jozef Jansen, Casteren (NL)

(73) Assignee: Mitutoyo Corporation, Kawasaki (JP)

( * ) Notice: Subject to any disclaimer, the term of this patent is extended or adjusted under 35 U.S.C. 154(b) by 413 days.

(21) Appl. No.: 12/949,150

(22) Filed: Nov. 18, 2010

(65) Prior Publication Data

US 2011/0122418 A1     May 26, 2011

(30) Foreign Application Priority Data

Nov. 20, 2009   (EP) .................................... 09176626

(51) Int. Cl.
*G01B 9/02*   (2006.01)
*G01B 11/02*  (2006.01)
*G01B 11/24*  (2006.01)
*G01N 21/00*  (2006.01)

(52) U.S. Cl.
USPC .............. 356/495; 356/73; 356/516; 356/601

(58) Field of Classification Search
USPC ............................ 356/495, 516, 603, 73, 601
See application file for complete search history.

(56) References Cited

U.S. PATENT DOCUMENTS

| 5,122,648 A * | 6/1992 | Cohen et al. ............... 250/201.3 |
| 5,392,116 A * | 2/1995 | Makosch ....................... 356/495 |
| 7,230,717 B2 * | 6/2007 | Brock et al. ................... 356/495 |
| 7,978,337 B2 * | 7/2011 | De Groot et al. ............. 356/495 |
| 2007/0165241 A1 * | 7/2007 | Laguart Bertran et al. ... 356/511 |

FOREIGN PATENT DOCUMENTS

| DE | 3108389 A1 * | 4/1982 |
| JP | 2007225341 A * | 9/2007 |
| WO | WO 2008067528 A2 * | 6/2008 |

OTHER PUBLICATIONS

Extended European Search Report dated Apr. 6, 2010 issued in European Patent Application No. 09176626.1.

* cited by examiner

*Primary Examiner* — Michael A Lyons
(74) *Attorney, Agent, or Firm* — Rankin, Hill & Clark LLP

(57) ABSTRACT

The invention relates to an apparatus and a method for determining a height map of a surface of an object. The apparatus can include positioning means for the object, a light source, an optical detector for converting the received light into electrical signals, first optics for directing light from the light source to the surface and for directing the light from the surface to the optical detector, a beam splitter located between the first optics and the surface, a reference mirror, second optics located between the beam splitter an the mirror for directing the light from the beam splitter to the mirror and from the mirror to the beam splitter, scanning means, processing means that converts the signal from the optical detector into a height map. The beam splitter can be a polarizing beam splitter. A controllable polarization controller can be located between the light source and the first optics.

15 Claims, 3 Drawing Sheets

APPARATUS FOR DETERMINING A HEIGHT MAP OF A SURFACE THROUGH BOTH INTERFEROMETRIC AND NON-INTERFEROMETRIC MEASUREMENTS

TECHNICAL FIELD

The subject invention relates to an apparatus and a method for determining a height map of a surface.

BACKGROUND

Some profilometers work in an interferometric mode to determine a height map of an object. These profilometers are suited for measuring tasks where an extreme high height resolution is required independently of the magnification of a microscope objective. However, in the interferometric mode, the profiler may be limited to measuring relatively smooth surfaces when used with low magnification objectives.

Other profilometers work in a non-interferometric mode. These profilometers include a microscope, which can be used as an optical sectioning microscope in a confocal microscope or as an optical sectioning microscope in a structured light illumination microscope (SIM). Confocal or structured illumination microscopes (SIM) are suited for measuring a height profile of structured surfaces in a low magnification range and generally provide better results when measuring steep slopes. Typically, non-interferometric optical sectioning microscopes provide faster measurements for a low magnification range at the cost of reduced height resolution.

Both types of measuring profilometers include a number of common components, such as lenses, which are generally expensive. In the non-interferometric mode, the interferometer may also be used as a traditional imaging microscope.

US 2007/0165241 relates to a profilometer which is used in the interferometric and the non-interferometric modes using expensive components for both types of measurements. The apparatus uses two types of objectives; one is adapted for use in interferometric measurements and the other is adapted for use in non-interferometric measurements. The apparatus includes the objectives in addition to lenses for directing light from a light source to the surface of the object.

Since the apparatus requires two objectives, the apparatus is expensive and needs a substantial volume for the two objectives. Further, since one objective is used for the interferometric measurements and the other is used for non-interferometric measurements, the apparatus need a mechanism for exchanging the objectives, e.g., a turntable. Such mechanism is a complex construction and requires an accuracy of positioning the objectives. Moreover, the apparatus needs pattern means located between a light source and a first optical means for applying a pattern to the light emitted by the light source when the apparatus is used as a non-interferometric measurement apparatus. The pattern means, however, is unnecessary for a viewing microscope.

U.S. Pat. No. 5,122,648 relates to a profilometer adapted to be used in an interferometric mode and in a non-interferometric mode. The profilometer includes a small reference mirror located concentrically in an objective. The mirror, however, is covered by a screen inserted into the objective in the non-interferometric mode. The mechanical cover of the mirror is a mechanical cumbersome solution.

SUMMARY

The following presents a simplified summary of the subject invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One object of the subject invention is to provide an apparatus and a method for determining a height map of a surface that can overcome all of or any of the problems described above. The apparatus can include positioning means for positioning an object having a surface to be measured, a light source, an optical detector adapted to convert received light into electrical signals, first optical means for directing light from the light source to the surface and for directing the light reflected by the surface to the optical detector, a beam splitter located between the first optical means and the surface, a reference mirror, second optical means located between the beam splitter and the mirror for directing the light from the beam splitter to the mirror and from the mirror to the beam splitter, scanning means for amending at least the distance between the sample and the focal plane of the objective, adapted to control the scanning means to perform a scanning action and to receive the signals from the optical detector, wherein the processing unit is adapted to convert the signals received from the optical detector into a height map.

In one aspect of the present invention, the subject invention provides an apparatus for determining a height map of a surface by interferometric and non-interferometric measurements wherein a beam splitter is a polarizing beam splitter, a controllable polarization controller is located between a light source and a first optical means, and processing means is adapted to control the polarization controller.

The subject invention can use properties of polarized light to allow the inclusion of optical components into optical paths or to exclude components from the optical paths by components working as switches under the control of the polarization angle of the light. The polarization controller can allow controlling the polarization angle of the light emitted by the light source so that the polarized light having a first polarization angle passes through a polarizing beam splitter and a branch of the light path containing the reference mirror is not used. The light passing through the polarizing beam splitter travels over a main optical path so that the light is used in the non-interferometric mode of the apparatus. When light having the polarization angle with two components is fed through the polarization controller, light having a polarization component with the first angle is directed to the main optical path only, while the light with the polarization component orthogonal thereto travels over the branched optical path including the reference mirror, thus obtaining the structure of an interferometer.

The use of polarized light can allow to 'switch' between an interferometric structure and a non-interferometric structure of the profilometer. To obtain a proper interference pattern to develop on a detector, an analyzing polarizer may be needed to locate between the first optical means and the optical detector. When the apparatus works in the interference mode, light beams with two different polarizations reach the analyzing polarizer. The analyzing polarizer folds the polarizations of both the measuring beam and the reference beam to the same polarization axis.

In another aspect of the present invention, a polarization controller includes a polarizer wherein control of a polarization angle of emitted light from a light source is performed by rotation of the polarizer. This embodiment can provide a simple, easily controllable configuration for the controllable polarizer and it can be used together with a light source adapted to generate non-polarized light.

If the light source is adapted to generate polarized light, then the polarization controller can include a rotatable half-wave plate, wherein control of the polarization angle of the emitted light is performed by rotation of the half-wave plate. This embodiment also can provide a simple, easily controllable configuration for the controllable polarizer.

In yet another aspect of the present invention, a polarization controller includes a clean-up polarizer that is rotatable around its optical axis. The angle of rotation can be the half of that of the half-wave plate. The polarizer can improve the polarization contrast ratio. The clean-up polarizer may be important in a non-interferometric mode where a high polarization contrast ratio is desired such that no light is directed to a reference arm of the interferometer.

In still yet another aspect of the present invention, a light source is adapted to generate polarized light and a polarization controller can include a liquid crystal polarizer. Control of the polarization angle of emitted light is performed by control of the liquid crystal polarizer. Due to the availability of the liquid crystal display, the controllable polarizing properties of a transparent wall, between which the actual liquid crystal is present, can be used, thereby allowing an easy adaptation of the liquid crystal as a polarization controller. In an LCoS display, the transparent wall may be glued to a reflective backplane. Then the optical element as a whole can be used as a reflective element. The liquid crystal polarization controller may also be an array of liquid crystal polarization controllers, which can be a part of a liquid crystal display. It is also possible to use illuminating LED arrays, transmissive LCDs, LCoS microdisplays (NLCoS, FLCoS, LCPG SLM), DMD microdisplay projection engines, fixed pattern displays or mirror scanning laser stripe projection systems.

In one aspect of the present invention, a liquid crystal polarizer is separated in an array of cells. This allows an interference contrast to be controlled. One effect of this feature is that it allows the liquid crystal polarizer to be used as a pattern generator in the SIM-configuration.

The polarization controller can be adapted to continuously control the polarization angle of the emitted light. This allows the ratio between the light directed to the reference arm and the measurement arm to be controlled to compensate for the reflection properties of the sample. Moreover, the method can allow for optimization of the interference contrast by fine tuning the split-ratio of the beam splitter in the interference objective. The method can allow fine tuning by choosing an input polarization angle such that the power of the received light by the detector is equally balanced between the reference light and the sample light.

The use of the apparatus as a viewing microscope may not require the presence of a pattern generator. The use as a non-interferometric profilometer may require the presence of such a filter. Pattern means can be located between the light source and the first optical means for applying a pattern to the light emitted by the light source.

The use of the apparatus as a non-interferometric profilometer may require a pattern generator to recognize patterns on the optical detector. As the pattern generator may disturb the measurements in the interferometric mode and its use as a 'normal imaging microscope,' the pattern generator is preferably switchable between an active state and an inactive state. It is noted that the active state can include all the polarization settings except the one where no light is directed towards the reference mirror of the polarized interference objective.

In another aspect of the present invention, the apparatus is adapted to be used as a viewing microscope.

In yet another aspect of the present invention, one feature of the invention is that a reference arm of an interferometer extends orthogonal to a measuring arm of the interferometer and that a polarizing beam splitter includes a semi transparent polarization sensitive mirror located with an angle of 45° relative to an optical axis. Hence the interferometer of Michelson configuration can be obtained.

In still yet another aspect of the present invention, one feature of the invention is that a reference arm and a measuring arm of an interferometer are coaxial and that a polarizing beam splitter includes a polarizing beam splitter with a wide angle acceptance range around a normal incidence (e.g., a beam splitter of a wire grid type). The beam splitter can be disposed such that a main plane of the beam splitter is perpendicular to an optical axis. Hence the interferometer of Mirau configuration can be obtained.

In one aspect of the present invention, the subject invention provides a kit of parts that converts an interferometric profilometer into an apparatus according to the invention described therein. The kit can include a polarizing beam splitter dimensioned to replace a beam splitter present in the interferometric profilometer; a controllable polarization controller adapted to be provided between a light source and a first optical means present in the interferometric profilometer; an analyzing polarizer adapted to be located between the first optical means and an optical detector present in the interferometric profilometer; and processing means adapted to control a polarization controller and to replace a processing means present in the interferometric profilometer. The kit of parts can allow converting an interferometric profilometer to the subject profilometer which can be used in the two modes of interferometer and non-interferometric, as described above. This is an attractive way of obtaining a multi use profilometer with a small expense.

In another aspect of the present invention, a method for determining a height map of a surface of a sample with a profilometer involves determining a height map of said surface by a first method selected from an interferometric method and a non-interferometric method; converting the profilometer from a first state adapted to execute the first method to a second state adapted to execute the other method of the interferometric method and the non-interferometric method that is not selected as the first method; and determining the height map of said surface by the second method, wherein converting the profilometer comprises amending a polarization angle of light used in the profilometer.

To the accomplishment of the foregoing and related ends, the invention, then, includes the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
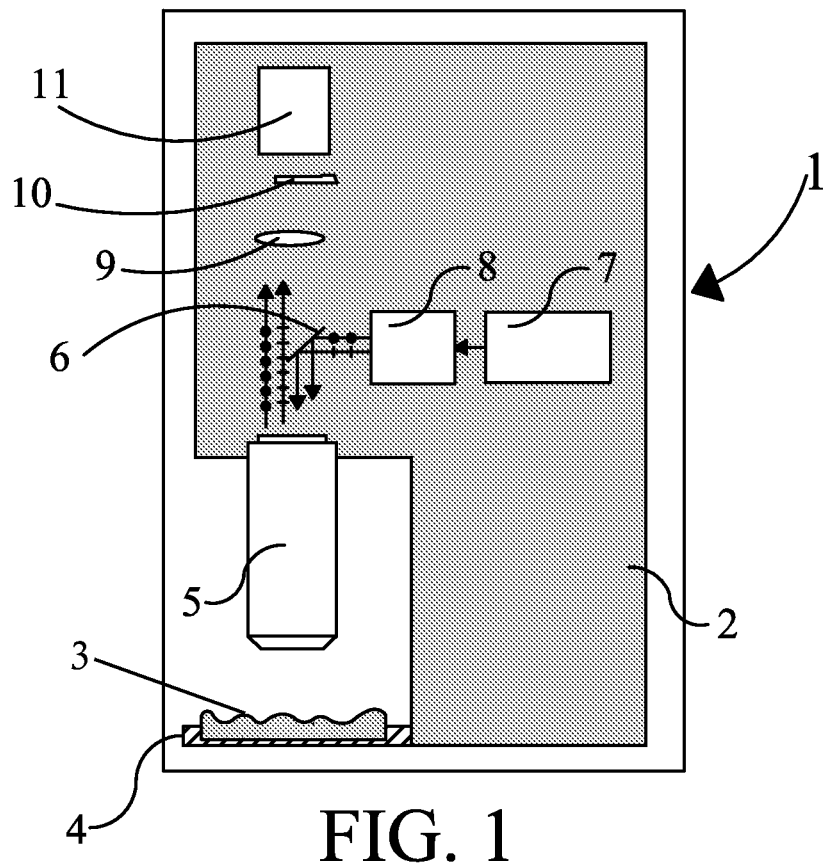
FIG. 1 is a diagram showing components of a profilometer according to the invention.

FIG. 1 illustrates a profilometer 1 that can include a frame 2 to which most components can be attached. The profilometer 1 can include a clamp 4 or similar means (e.g., sample holding means) for locating a sample or object 3 of which the height (z-axis) as a function of the position in the surface perpendicular thereto (x- and y-axes) is to be measured. The apparatus 1 can be adapted to determine the height map of the sample 3. The profilometer 1 further can include an objective 5, a beam splitting mirror 6, a light source 7, and a controllable polarizer 8, which can be connected to the frame 2. Further, the profilometer 1 can include a lens 9, an analyzing polarizer 10, and a camera or light sensitive element 11. It is noted that the light source 7 may be formed by a conventional light source such as a light source adapted to generate white light of a patterned light or a light source adapted to generate a patterned light beam, which is useful in structured interference measurements. Further, although not depicted in FIG. 1, a digital computational unit can be adapted to control the controllable elements (e.g., the controllable polarizer 8, the scanning motion of the objective 5, and the camera 11) to process the images recorded by the camera 11.

Generally speaking, the light emitted by the light source 7 is polarized by the controllable polarizer 8 directed to the beam splitting mirror 6 where it is directed to the objective 5. From the objective 5, the light reaches the sample 3 located in the sample holding means 4. The light is reflected by the sample 3, travels through the objective 5 in the opposite direction and through the beam splitting mirror 6, the lens 9, and the analyzing polarizer 10, and reaches the camera 11 where the light is converted into an electrical signal. The electrical signal provided can be fed to the computational unit where the electrical signal can be processed and analyzed.

Figure 2:
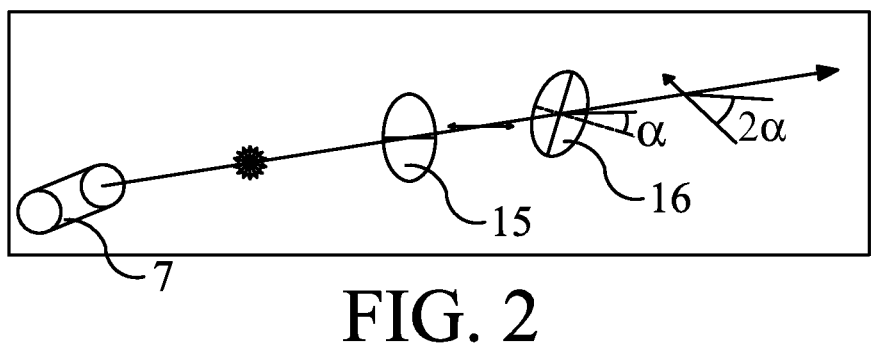
FIG. 2 is a diagram showing components of a controllable polarizer.

The controllable polarizer 8 can be used to switch the profilometer into the interferometric mode or the non-interferometric mode. FIG. 2 illustrates the controllable polarizer 8 that can include a polarizing filter 15 and a half-wave plate 16 located downstream from the polarizing filter 15 and mounted to be rotatable around the optical axis of the polarizer 8. This device can be adapted to convert non-polarized light generated by the light source 7 into polarized light with a controllable polarization angle. The light emerging from the polarizer 8 is polarized in a single fixed direction, as shown in FIG. 2. The half-wave plate 16 can add an angle to polarization axis of the light, which is equal to the double of the rotation angle of said plate 16. Hence the polarization angle of the light emerging from the controllable polarizer 8 can be controlled by rotation of the wave plate 16. As stated above, other kinds of controllable polarizes can be used.

Figure 3A:
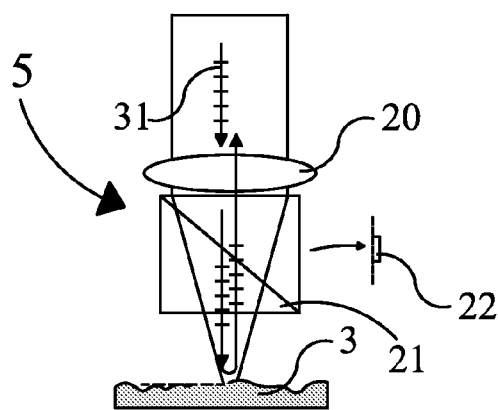
FIG. 3A is a diagram showing a profilometer according to a first embodiment in a non-interferometric mode.

FIG. 3A illustrates an objective 5 of a first embodiment which can be used in a non-interferometric configuration. The objective 5 can include a lens 20 which can be replaced by lenses of other configurations or multiple lenses depending on the design. Further, the objective 5 can include a polarizing beam splitter 21 and a reference mirror 22. The reference mirror 22 can be located in the focal plane or close to the focal plane of the objective 5 as the sample 3 can be located in the focal plane or close to the focal plane of the objective 5. As FIG. 3A shows, due to the polarization angle of the light beam 31 entering the polarizing beam splitter 21, the light beam 31 can pass through the polarizing beam splitter 21. The light beam 31 passes through the polarizing beam splitter 21 and is reflected by the sample 3. The reflected light beam can pass through the polarizing beam splitter 21 again. The measurement of the height of the sample then takes place by a non-polarizing method, for instance, by analyzing a stack of vertically scanned images reflected by the sample 3 onto the camera 11. In this embodiment, the reference mirror 22 is not functioning. Suitable techniques such as spatial contrast detection profilometry, confocal microscopy, and structured illumination optical sectioning microscopy (SIM) can be used for profilometry in the non-interferometric mode.

Figure 3B:
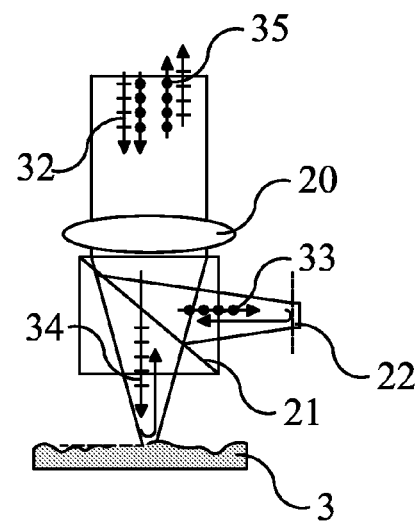
FIG. 3B is a diagram showing a profilometer according to the first embodiment in an interferometric mode and having the configuration of a Michelson type interferometer.

FIG. 3B shows an objective 5 operating in the interferometric mode. A light beam 32 is polarized in two directions. The light beam 32 enters the polarizing beam splitter 21 and is split into a sample beam 34 directed to a sample 3 and a reference beam 33 directed to a reference mirror 22. This is caused by the fact that the polarization angle of the light beam 32 entering the polarizing beam splitter 21 includes components with polarization in the both directions. The resulting reference and sample beams 33, 34 are reflected by the reference mirror 22 and the sample 3, respectively, and the resulting beams 33, 34 are combined at the polarizing beam splitter 21 to a combined beam 35 and directed towards the camera 11. When used in the interference mode, the camera 11 can be preceded in the optical path by an analyzing polarizer 10 as illustrated in FIG. 1 to allow an interference pattern to develop. The image provided to the camera 11 can be subsequently analyzed and processed. It is noted that there is an angular separation between the reference arm 33 and the sample arm 34 of the interferometer and therefore the configuration of the interferometer incorporated into the profilometer is that of a Michelson interferometer.

Figure 4A:
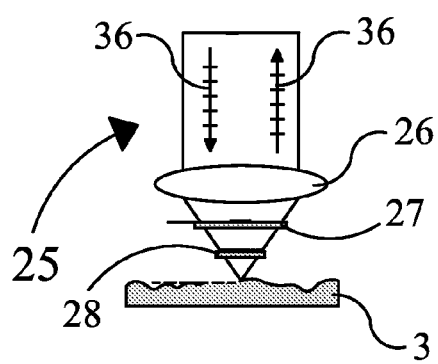
FIG. 4A is a diagram showing a profilometer according to a second embodiment in a non-interferometric mode.

FIG. 4A illustrates an objective 25 of a second embodiment which can be used in a non-interferometric configuration. The objective 25 can include a lens 26 in the same manner as the first embodiment and a polarizing beam splitter which is embodied as a wire grid polarizing beam splitter 28. The wire grid polarizing beam splitter 28 can be adapted to split the light entering it into a reference beam and a sample beam, if light with corresponding polarization is used. A reference mirror 27 can be located in the optical axis of the objective 25. As FIG. 4A shows, the polarization angle of the light beam 36 entering the polarizing beam splitter 28 is identical to the polarization axis along which the polarizing beam splitter is transparent. The light beam 36 passes the polarizing beam splitter 28 and is reflected by the sample 3, and then passes the polarizing beam splitter 28 again. Measurement of the height of the sample 3 then takes place by a non-interferometric method, for example, by projecting sample images and analyzing a stack of images reflected by the sample 3 onto the camera 11. In this embodiment, the reference mirror 27 is not functioning.

Figure 4B:
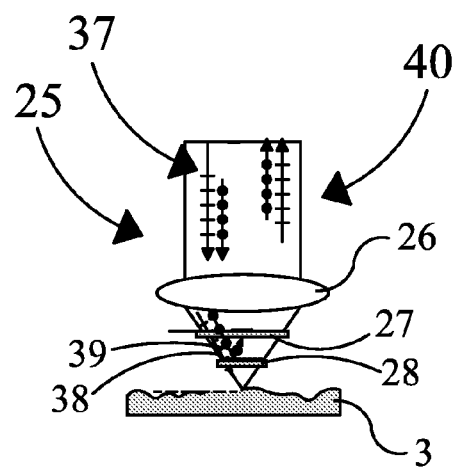
FIG. 4B is a diagram showing the profilometer according to the second embodiment in an interferometric mode and having the configuration of a Mirau type interferometer.

FIG. 4B illustrates the objective 25 operating in the interferometric mode. The light beam 37 entering the polarizing beam splitter 28 is split into a sample beam 38 directed to the sample 3 and a reference beam 39 directed to the reference mirror 27. This is caused by the fact that the polarization angle of the light beam 37 entering the polarizing beam splitter 28 includes components with polarization in the both directions.

The resulting reference and sample beams 38, 39 are reflected by the reference mirror 27 and the sample 3, respectively, and the resulting beams are combined at the polarizing beam splitter 28 to a beam 40 and directed towards the camera 11. In this embodiment, the camera can be preceded in the optical path by an analyzing polarizer 10, as illustrated in FIG. 1, to allow an interference pattern to develop. A stack of vertically scanned images provided to the camera 11 can be subsequently analyzed and processed. It is noted that the configuration of the interferometer incorporated into the profilometer is that of a Mirau interferometer.

Figure 5:
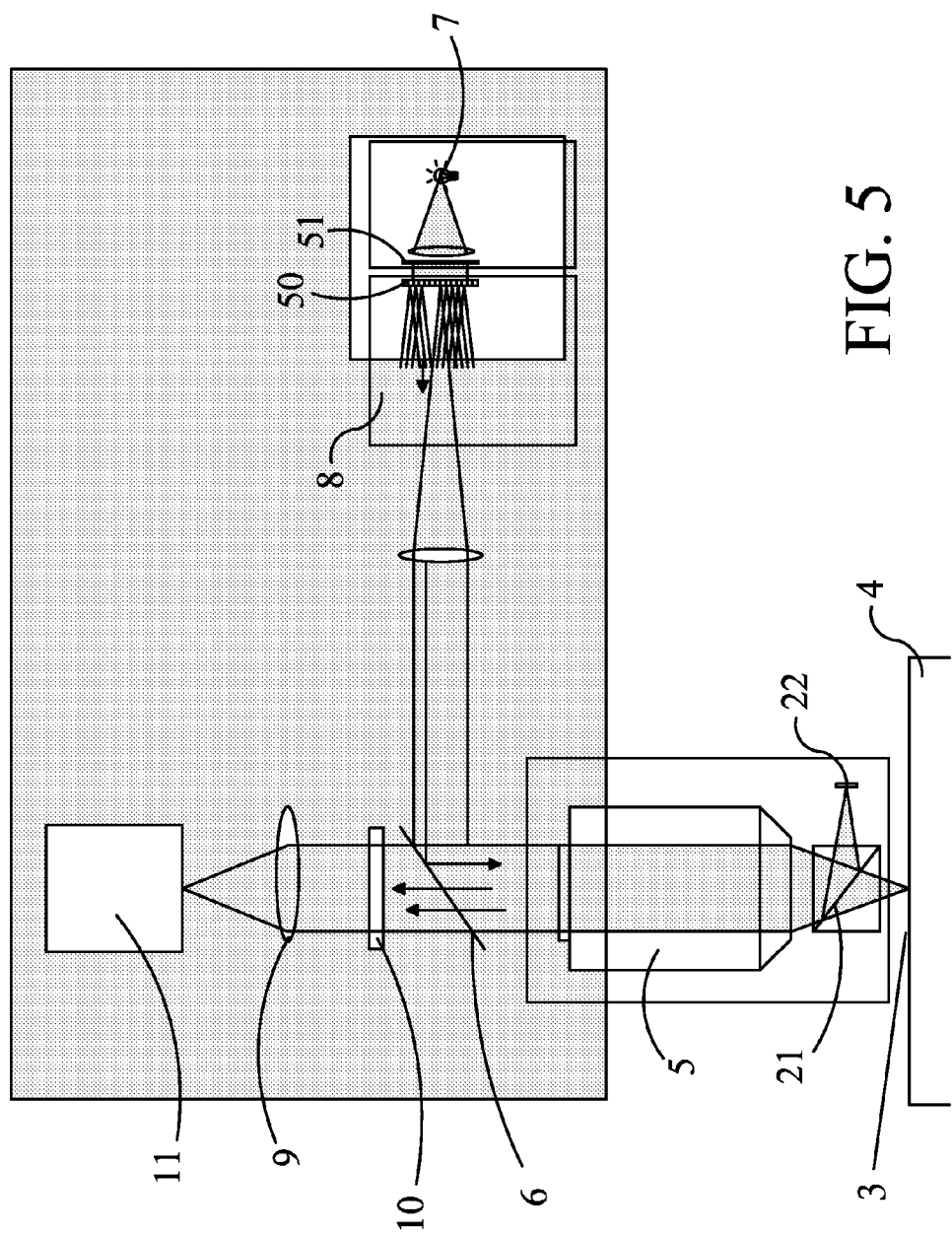
FIG. 5 is a diagram showing a third embodiment having a configuration of Michelson configuration.

FIG. 5 illustrates a third embodiment with a Michelson configuration wherein a polarization controller 8 of a light source 7 is provided with a liquid crystal unit 50. The liquid crystal unit 50 can allow controlling the polarization angle of the light emerging from the unit 50. The light source 7 can be adapted to generate polarized light as it contains a polarization filter 51. The liquid crystal unit 50 can include a substantial number of separate cells. This can allow controlling the distribution of light over the surface of the sample 3 to correct for local differences in reflection of the sample. When this embodiment is used in a SIM mode, the liquid crystal unit 50 can be used to generate a pattern which is used in the SIM process. The other components of this embodiment are similar to those in the preceding embodiments. It is noted that this embodiment can be used in the Mirau configuration.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain," "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain,' "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. An apparatus for determining a height map of a surface in an interferometric mode and in a non-interferometric mode, the apparatus comprising:
    positioning means for positioning an object having the surface to be measured;
    a light source;
    an optical detector adapted to convert received light into electrical signals;
    first optical means for directing light from the light source to the surface and for directing the light reflected by the surface to the optical detector;
    a beam splitter located between the first optical means and the surface; and
    a reference mirror that reflects the light from the beam splitter back to the beam splitter;
    wherein
    the beam splitter is a polarizing beam splitter;
    a controllable polarization controller is located between the light source and the first optical means, the controllable polarization controller polarizing the light from the light source and forming polarized light having only one component with a first angle in the non-interferometric mode so that the polarized light passes through the polarizing beam splitter and the controllable polarization controller polarizing the light from the light source and forming polarized light having two components with the first angle and a second angle, respectively, in the interferometric mode so that the polarized light having the polarization component with the first angle passes through the polarizing beam splitter and the polarized light having the polarization component with the second angle is reflected by the polarizing beam splitter; and
    an analyzing polarizer is located between the first optical means and the optical detector.

2. The apparatus of claim 1, wherein the light source is adapted to generate polarized light, the polarization controller comprises a polarizer rotatable around its optical axis, and control of a polarization angle of the light emitted by the light source is performed by rotation of the polarizer.

3. The apparatus of claim 1, wherein the polarization controller comprises a polarizer and a rotatable half-wave plate and control of a polarization angle of the light emitted by the light source is performed by rotation of the half-wave plate.

4. The apparatus of claim 3, wherein the polarizer is rotatable around its optical axis and the angle of rotation of the polarizer is half of that of the half-wave plate.

5. The apparatus of claim 1, wherein the light source is adapted to generate polarized light, the polarization controller comprises a liquid crystal polarizer, and control of the polarization angle of the light emitted by the light source is performed by control of the liquid crystal polarizer.

6. The apparatus of claim 5, wherein the liquid crystal polarizer is separated in an array of cells.

7. The apparatus of claim 1, wherein the polarization controller is adapted to continuously control a polarization angle of the light emitted by the light source.

8. The apparatus of claim 1, further comprising:
    pattern means located between the light source and the first optical means for applying a pattern to the light emitted by the light source.

9. The apparatus of claim 8, wherein the pattern means is switchable between an active state and an inactive state.

10. The apparatus of claim 1, wherein the apparatus is adapted to be used as a viewing microscope.

11. The apparatus of claim 1, wherein a reference arm of the apparatus extends orthogonal to a measuring arm of the apparatus and the polarizing beam splitter comprises a semi transparent polarization sensitive mirror located with an angle of 45° relative to an optical axis.

12. The apparatus of claim 1, wherein a reference arm and a measuring arm of the apparatus are coaxial and the polarizing beam splitter is a wire grid polarizing beam splitter disposed such that a main plane of the beam splitter is perpendicular to an optical axis.

13. A kit of parts that converts an interferometric profilometer into an apparatus of claim 1, the kit comprising:
    a polarizing beam splitter dimensioned to replace a beam splitter present in the interferometric profilometer;
    a controllable polarization controller adapted to be provided between the light source and the first optical means present in the interferometric profilometer; and
    an analyzing polarizer adapted to be located between the first optical means and the optical detector present in the interferometric profilometer.

14. A method for determining a height map of a surface of an object with a profilometer, the method comprising:

determining the height map of said surface by a first method selected from an interferometric method and a non-interferometric method;

converting the profilometer from a first state adapted to execute the first method to a second state adapted to execute the other method of the interferometric method and the non-interferometric method that is not selected as the first method; and determining the height map of said surface by the other method, wherein converting the profilometer comprises changing the number of polarization angle of light used in the profilometer from one to two for the interferometric method and from two to one for the non-interferometric method.

15. The method of claim 14, wherein converting the profilometer further comprises polarizing the light and forming polarized light having only one component with a first angle for the non-interferometric method to pass the polarized light through a polarizing beam splitter, and polarizing the light and forming polarized light having two components with the first angle and a second angle, respectively, for the interferometric method to pass the polarized light having the polarization component with the first angle through the polarizing beam splitter and to reflect the polarized light having the polarization component with the second angle by the polarizing beam splitter.

* * * * *